United States Patent
Gorbatov et al.

(10) Patent No.: US 9,223,379 B2
(45) Date of Patent: Dec. 29, 2015

(54) INTELLIGENT RECEIVE BUFFER MANAGEMENT TO OPTIMIZE IDLE STATE RESIDENCY

(71) Applicant: Intel Corporation, Santa Clara, CA (US)

(72) Inventors: Eugene Gorbatov, Hillsboro, OR (US); Paul S. Diefenbaugh, Portland, OR (US); Eric K. Mann, Hillsboro, OR (US); Jr-Shian Tsai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 13/728,355

(22) Filed: Dec. 27, 2012

(65) Prior Publication Data

US 2014/0189385 A1     Jul. 3, 2014

(51) Int. Cl.
*G06F 1/32*     (2006.01)
(52) U.S. Cl.
CPC ............... *G06F 1/3234* (2013.01); *Y02B 60/32* (2013.01)

(58) Field of Classification Search
None
See application file for complete search history.

(56) References Cited

U.S. PATENT DOCUMENTS

| 2009/0077401 A1* | 3/2009 | Tsai ............................. 713/320 |
| 2012/0210032 A1* | 8/2012 | Wang et al. .................. 710/260 |

* cited by examiner

*Primary Examiner* — Paul Yanchus, III
(74) *Attorney, Agent, or Firm* — Jordan IP Law, LLC

(57) ABSTRACT

Methods and systems may provide for determining a plurality of buffer-related settings for a corresponding plurality of idle states and outputting the plurality of buffer-related settings to a device on a platform. The device may determine an observed bandwidth for a channel associated with a receive buffer and identify a selection of a buffer-related setting from the plurality of buffer-related settings based at least in part on the observed bandwidth. In one example, each buffer-related setting includes a latency tolerance and a corresponding idle duration.

26 Claims, 3 Drawing Sheets

INTELLIGENT RECEIVE BUFFER MANAGEMENT TO OPTIMIZE IDLE STATE RESIDENCY

BACKGROUND

1. Technical Field

Embodiments generally relate to power management in computing platforms. More particularly, embodiments relate to intelligently managing device buffers in order to optimize computing platform idle state residency.

2. Discussion

Computing platforms may use idle states to reduce power consumption, wherein input output (IO) devices on the platform may buffer data intended for the platform while the platform is in a given idle state. In particular, an IO device might allocate some of its buffer space to a period of time corresponding to the idle state residency (e.g., idle duration) and some of the buffer space to a time period corresponding to the platform's exit from the idle state (e.g., resume duration, latency tolerance). If an insufficient amount of buffer space is allocated to the idle duration, the IO device may issue break events (e.g., interrupts) that force the platform to exit the idle state in question prematurely, which may in turn have a negative impact on energy efficiency. Moreover, the buffer space allocation for latency tolerance may be determined in conventional solutions based on a maximum (e.g., "worst case") line speed, wherein such an approach may either limit the platform to using relatively shallow idle states or require an increase in buffer space to account for the worst case scenario.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
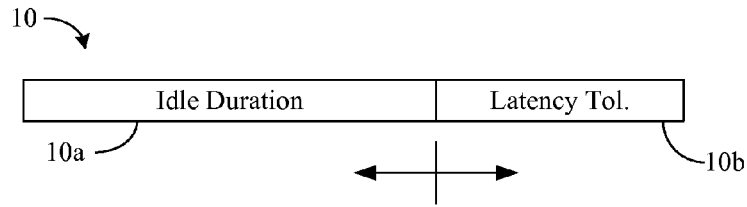
FIG. 1 is a block diagram of an example of a buffer according to an embodiment.

FIG. 1 shows a buffer 10 (10a,10b) that may be used by an input output (IO) device (not shown) such as a network controller, audio controller, video controller, camera pipeline component, and so forth, to buffer data destined for a computing platform (not shown). Thus, in the case of a network controller, the buffer 10 might be used to buffer communications from a wireless or wired network for processing by the computing platform. In the case of an audio controller, the buffer 10 may be used, for example, to buffer audio content for audible output via the computing platform. Similarly, in the case of a video controller, the buffer 10 may be used to buffer video content for visual output via the computing platform. Other types of IO devices may also store data to the buffer 10 for delivery to a computing platform.

In the illustrated example, a first portion 10a of the buffer 10 is allocated to an idle duration, which may correspond to a time period during which the computing platform enters and resides in an idle state such as, for example, an Advanced Configuration and Power Interface (e.g., ACPI Specification, Rev. 5.0a, Dec. 6, 2011) low power state. A second portion 10b of the buffer 10 may be allocated to a resume duration (e.g., latency tolerance) of the IO device, wherein the first portion 10a and the second portion 10b may vary in size depending upon the partitioning between the first portion 10a and the second portion 10b. Of particular note is that the sizes of the first portion 10a and the second portion 10b may be coordinated with one another and tailored to the particular idle state selected by the platform.

As a result, the illustrated buffer 10 enables the buffer partition configuration to be optimized in order to reduce the likelihood of the first portion 10a filling up too quickly, while ensuring that the second portion 10b is also large enough to support exits from the selected idle state. Moreover, the size of the second portion 10b may be selected based on the observed bandwidth for the channel (e.g., network, audio, video, camera pipeline) associated with the buffer 10, rather than the worst case line speed of the channel. Such an approach may enable the size of the second portion 10b to be reduced, which may facilitate an enlargement of the first portion 10a, and in turn, the selection of deeper idle states. Such an approach may also enable entry of deeper platform idle states if the latency tolerance computed based on worst case line speed/rate is too low.

Figure 2:
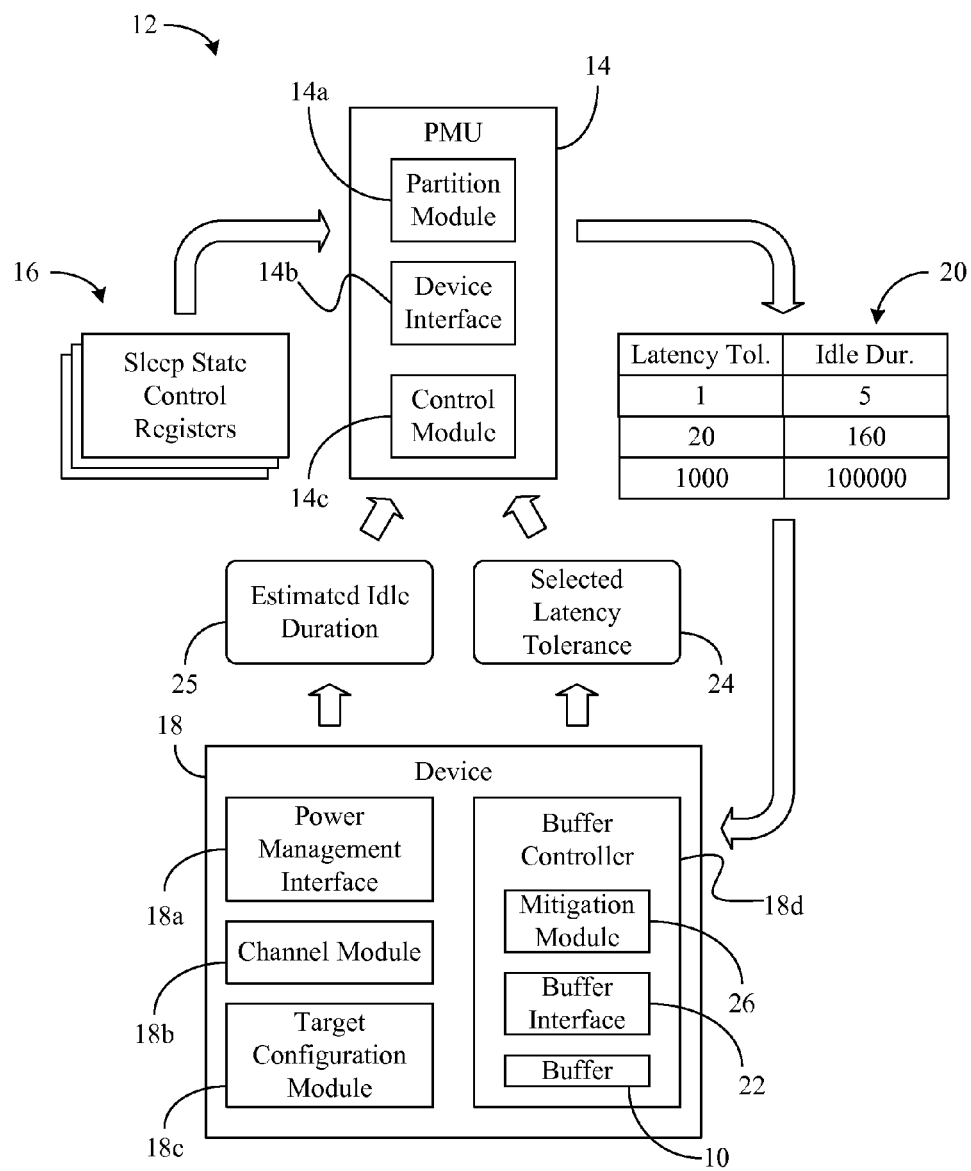
FIG. 2 is a block diagram of an example of a buffer management architecture according to an embodiment.

FIG. 2 shows a buffer management architecture 12 in which a power management controller/unit 14 (14a-14c) includes a partition module 14a that determines a plurality of buffer-related settings for a corresponding plurality of idle states. Platform idle states may include, for example, ACPI S0ix system states, or other low power states. As will be discussed in greater detail, each buffer-related setting may include a latency tolerance (e.g., latency tolerance requirement/LTR) and a corresponding idle duration, wherein the latency tolerance and idle duration may be specified in units of time (e.g., milliseconds). The buffer-related settings may be determined based on values stored in one or more idle state control registers 16 (e.g., mode specific registers/MSRs), which may be programmed by platform BIOS (basic input output system) logic at startup or other appropriate time. The illustrated power management unit (PMU) 14 further includes a device interface 14b to output one or more of the buffer-related settings in a manner that exposes the settings to one or more IO devices (e.g., network controller, audio controller, video controller, etc.) on the platform such as a device 18 (18a-18d).

The buffer-related settings may therefore define LTRs and idle durations for different platform idle states. In other words, each platform idle state may be defined as having an LTR and idle duration parameter set (e.g., pairing). The LTR can specify exit latency, whereas the idle duration may specify the minimum residency needed to amortize entry/exit costs (e.g., energy break-even time) for the platform idle state in question. These settings may be considered "buffer-related" since IO devices can use them to partition buffer space. The buffer-related settings may therefore define idle state characteristics that are used by other platform entities for different purposes.

In the illustrated example, the partition module 14a stores the buffer-related settings to a partition table 20, which is accessed by a power management interface 18a of the device 18 in order to identify the candidate buffer-related settings. The partition table 20 may be stored, for example, to one or more memory-mapped registers during boot and/or reset processes. Additionally, the information in the partition table 20 may be conveyed directly to devices that are integrated with core logic (e.g., via sideband messages) as well as to external devices (e.g., via in-band messages or software). The PMU 14 could also dynamically convey a single target (e.g., idle duration and latency tolerance) to the device 18. Such an approach may be used as an alternative "de facto" mode of operation for shorter periods if inactivity/idleness.

The device 18 may also include a channel module 18b that determines a bandwidth (e.g., observed) for a channel associated with a receive buffer such as, for example, the buffer 10, wherein the observed bandwidth may in some cases be substantially lower than the maximum line speed (e.g., highest data rate) of the channel. Thus, the observed bandwidth determination may be made in real-time during system operation. Moreover, the observed bandwidth can represent, for example, the data rate of a network controller, the frame rate of an audio and/or video controller, and so forth. The illustrated device 18 also includes a buffer controller 18d that identifies a selection of a buffer-related setting from the plurality of buffer-related settings based at least in part on the observed bandwidth.

In one example, a target configuration module 18c determines a target buffer configuration based at least in part on the observed bandwidth, wherein the buffer controller 18d compares the target buffer configuration to the latency tolerance and idle duration of one or more of the plurality of buffer-related settings in the partition table 20. The device may therefore search the plurality of buffer-related settings and select one that meets both latency tolerance and idle duration given the buffer space in the device (e.g., the buffer may be partitioned to meet both while ensuring that platform can enter the deepest idle state possible).

Thus, in the illustrated example, if the observed bandwidth permits a target latency tolerance of one hundred milliseconds, the highest entry in the partition table 20 that complies with the target latency tolerance (e.g., the second entry), might be selected provided the remaining buffer space is sufficient to meet device idle duration. A buffer interface 22 of the buffer controller 18d may partition the buffer 10 in accordance with the selected latency tolerance 24 (e.g., converting time values into bytes), which may also be reported to the PMU 14 by the power management interface 18a. Additionally, the power management interface 18a may report an expected idle duration 25 to the PMU 14. In this regard, the idle duration that appears in the partition table 20 may be different from device idle duration computed by the device. More particularly, the idle duration value in the partition table 20 may indicate the amount of time needed to amortize entry/exit into platform idle state with the associated latency tolerance. When the device 18 selects a latency tolerance, the device 18 ensures that it has enough buffer space left to meet this minimum idle duration. The idle duration 25 communicated to the PMU may therefore be the expected idle duration computed as a function of bandwidth and buffer space not allocated to latency tolerance.

The illustrated PMU 14 also includes a control module 14c to receive the selected latency tolerance 24 (e.g., identify the selection of the buffer-related setting) and expected idle duration 25, and select one of the plurality of idle states for the platform based at least in part on the selected latency tolerance 24 from the device 18. The selection of the idle state may also take into consideration the expected idle duration 25. In addition, the idle state selection may be a function of latency tolerances and/or expected idle durations reported by other devices on the platform that are "aligned" with the device 18 during the idle duration.

The illustrated buffer controller 18d may also include a mitigation module 26 to determine a packet loss ratio of the channel associated with the buffer 10, and modify the selected latency tolerance 24 based at least in part on the packet loss ratio. For example, if it is determined that the packet loss ratio exceeds a particular loss threshold (e.g., x percent of packets over a moving time window adjusted with a guard band), the selected latency tolerance 24 may be reduced in order to bring the packet loss ratio back below the loss threshold. Both the time window and the guard band parameters may be used to control the aggressiveness of latency tolerance settings and allowed platform idle states. Thus, for example, the latency tolerance of an even lower entry in the partition table 20 (e.g., the first entry) might be reported as the selected latency tolerance 24 if it is determined that the buffer 10 has begun dropping packets. Indeed, the selected latency tolerance 24 may even be reduced to zero in order to comply with the loss threshold constraint over the moving time window.

In one example, the architecture 12 includes logic that at least partially includes hardware logic. In such a case, the hardware logic may be implemented in the PMU 14 as, for example, the partition module 14a, the device interface 14b and/or the control module 14c. Additionally, the hardware logic may be implemented in the device 18 as, for example, the power management interface 18a, the channel module 18b, the target configuration module 18c and/or the buffer controller 18d.

Figure 3:
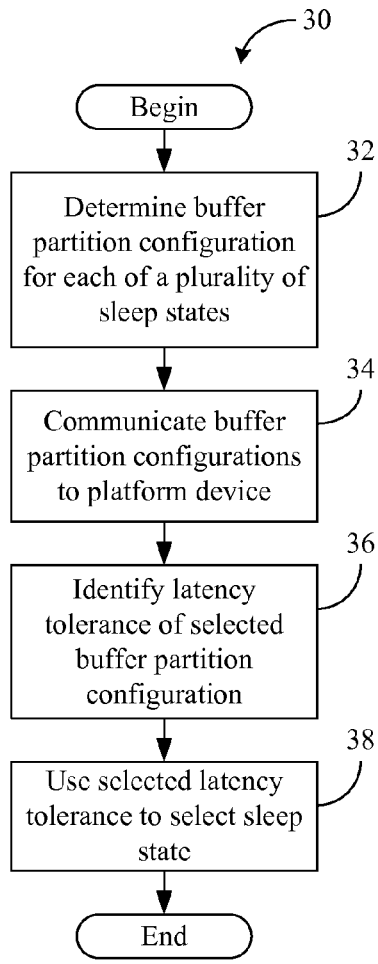
FIG. 3 is a flowchart of an example of a method of operating a power management unit according to an embodiment.

Turning now to FIG. 3, a method 30 of operating a power management controller/unit such as, the PMU 14 (FIG. 2), is shown. The method 30 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 30 may be written in any combination of one or more programming languages, including an object oriented programming language such as Java, Smalltalk, C++ or the like and conventional procedural programming languages, such as the "C" programming language or similar programming languages.

Illustrated processing block 32 provides for determining a buffer-related setting for each of a plurality of idle states, wherein the result may be a corresponding plurality of buffer-related settings (e.g., latency tolerance and idle duration parameter sets). One or more of the plurality of buffer-related settings 34 may be communicated to a platform device at block 34. Block 34 might involve storing a partition table of latency tolerances and corresponding idle durations to one or more memory-mapped registers, sending the partition table directly to an integrated logic device via sideband messages, and so forth, as already noted. Illustrated block 36 identifies a latency tolerance of a selected buffer-related setting, wherein the buffer-related setting selection is made by the platform device. In this regard, the device may select a buffer partition configuration based on both LTR and device idle duration (DID). For some platform idle states, the device may meet LTR but will not have enough buffer space left to sustain the entire idle duration. The device can therefore search the table for the LTR/DID pair that meets both requirements. The selected latency tolerance may be used to select an idle state for the platform at block 38.

Figure 4:
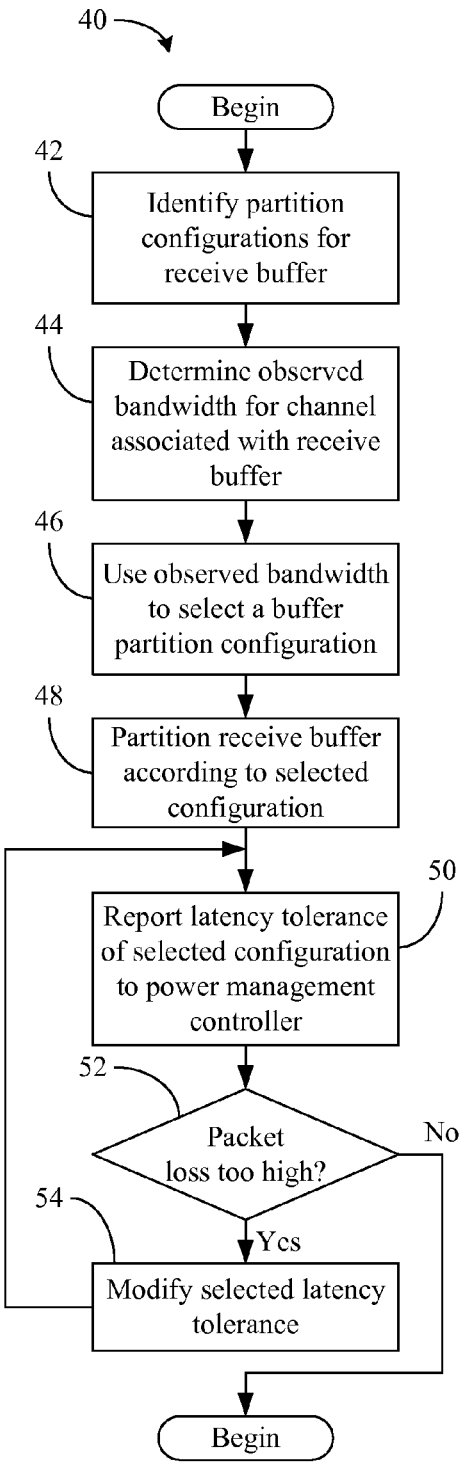
FIG. 4 is a flowchart of an example of a method of operating an input output (IO) device according to an embodiment.

FIG. 4 shows a method 40 of operating an IO device such as, the device 18 (FIG. 2), is shown. The method 40 may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. For example, computer program code to carry out operations shown in method 40 may be written in any combination of one or more programming languages, including an object oriented programming language such as Java, Smalltalk, C++ or the like and conventional procedural programming languages, such as the "C" programming language or similar programming languages.

Illustrated processing block 42 provides for identifying a plurality of buffer-related settings for a receive buffer of a device, wherein an observed bandwidth may be determined at block 44 for a channel associated with the receive buffer. Block 46 may use the observed bandwidth to select a buffer-related setting from the plurality of buffer-related settings. As already noted, the selection of the buffer-related setting can include a selected latency tolerance and a corresponding selected idle duration. The receive buffer may be partitioned at block 48 in accordance with the selected buffer-related setting, wherein the selected latency tolerance may also be reported to a power management controller at block 50. A determination may be made at block 52 as to whether the packet loss ratio of the channel in question is too high. Thus, the determination at block 52 might involve determining whether the packet loss ratio exceeds a loss threshold. If so, illustrated block 54 modifies the selected latency tolerance in order to reduce the packet losses to an acceptable level. The modification may include, for example, selecting a different entry from a partition table in order to reduce the selected latency tolerance, as already discussed. The modified latency tolerance may then be reported to the power management controller again at block 50 and the packet loss determination may be repeated at block 52 until the packet losses have fallen below the loss threshold.

Figure 5:
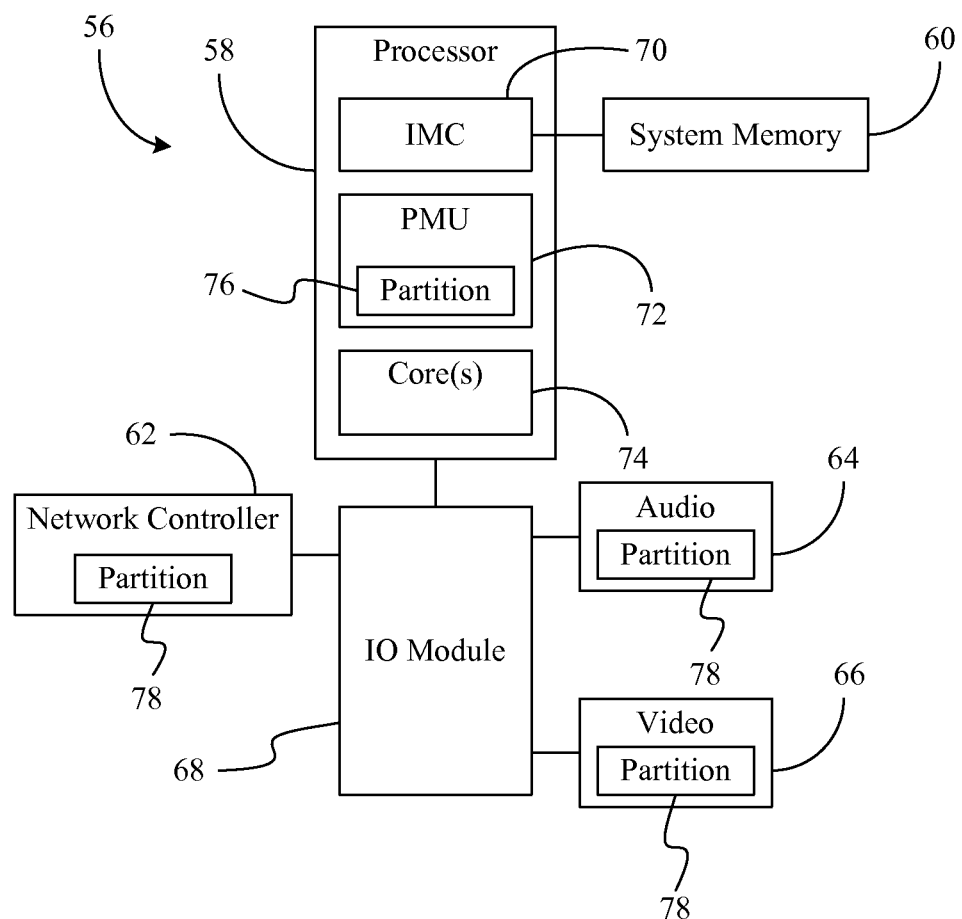
FIG. 5 is a block diagram of an example of a computing platform according to an embodiment.

Turning now to FIG. 5, a computing platform 56 is shown. The platform 56 may be part of a device having computing functionality (e.g., server, workstation, desktop computer, personal digital assistant/PDA, notebook computer, smart tablet), communications functionality (e.g., wireless smart phone), imaging functionality, media playing functionality (e.g., smart television/TV), or any combination thereof (e.g., mobile Internet device/MID). In the illustrated example, the platform 56 includes a processor 58, system memory 60, a network controller 62, an audio controller 64, a video controller 66, and an IO module 68. The processor 58 may include an integrated memory controller (IMC) 70, a power management unit (PMU) 72 and a core region with one or several processor cores 74. The processor 58 and the IO module 68 may alternatively be implemented on the semiconductor die as a system on chip (SoC), depending upon the circumstances.

The illustrated IO module 68, sometimes referred to as a Southbridge or South Complex of a chipset, functions as a host controller and communicates with the network controller 62, which could provide off-platform communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), 4G LTE (Fourth Generation Long Term Evolution), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The IO module 68 may also include one or more wireless hardware circuit blocks to support such functionality.

The system memory 60 may include, for example, double data rate (DDR) synchronous dynamic random access memory (SDRAM, e.g., DDR3 SDRAM JEDEC Standard JESD79-3C, April 2008) modules. The modules of the system memory 60 may be incorporated into a single inline memory module (SIMM), dual inline memory module (DIMM), small outline DIMM (SODIMM), and so forth. The platform 56 may also include a solid state disk (SSD, not shown) having one or more NAND (negated AND) chips that might be used to provide high capacity data storage and/or a significant amount of parallelism. The SSD could also be used as a USB (Universal Serial Bus, e.g., USB Specification 3.0, USB Implementers Forum) flash storage device.

The illustrated network controller 62, audio controller 64 and video controller 66 may therefore be considered IO devices that may provide data, content and/or instructions to the IO module 68 and/or processor 58, for a wide variety of purposes. In the illustrated example, the PMU 72 includes management partition logic 76 that determines buffer-related settings for idle states employed by the platform 56, and communicates the buffer-related settings to the network controller 62, the audio controller 64 and the video controller 66. In one example, the buffer-related settings are written to a partition table that is exposed to those devices. The network controller 62, audio controller 64 and video controller 66 may also include device partition logic 78 that identifies the buffer-related settings, determines an observed bandwidth for one or more channels associated with receive buffers of the respective devices, and identifies selections of buffer-related settings from the setting options provided by the PMU 72 based on the observed bandwidth information. The PMU 72 may also place the platform 56, processor 58 and/or IO module 68 in one or more idle states based on the buffer-related setting selections made by the network controller 62, audio controller 64, and video controller 66.

Thus, techniques described herein may provide IO devices with target latency tolerance/idle duration pairings that may be used in determining buffer space partitions. In addition, a bandwidth based mechanism of computing latency tolerance values may augment the solution along with a technique to mitigate and control packet loss. The combination of these solutions may improve device behavior, enable the user of deeper idle states, and greatly enhance system energy efficiency.

Embodiments may therefore include a platform having a power management controller with a partition module to determine a plurality of buffer-related settings for a corresponding plurality of idle states, and a device interface to output the plurality of buffer-related settings. The platform may also have a device with a receive buffer and a power management interface to identify the plurality of buffer-related settings. Additionally, the device may include a channel module to determine an observed bandwidth for a channel associated with the receive buffer, and a buffer controller to identify a selection of a buffer-related setting from the plurality of buffer-related settings based at least in part on the observed bandwidth.

Embodiments may also include a non-transitory computer readable storage medium having a set of instructions which, if executed by a processor, cause a power management controller to determine a plurality of buffer-related settings for a corresponding plurality of idle states. The instructions, if executed, may also cause the power management controller to communicate the plurality of buffer-related settings to a device associated with a platform.

Embodiments may also include a non-transitory computer readable storage medium having a set of instructions which, if executed by a processor, cause a device to identify a plurality of buffer-related settings for a receive buffer of the device, and determine an observed bandwidth for a channel associated with the receive buffer. The instructions, if executed, may also cause the device to identify a selection of a buffer-related setting from the plurality of buffer-related settings based at least in part on the observed bandwidth.

Embodiments may also include a method of operating a device that involves identifying a plurality of buffer-related settings for a receive buffer of the device. The method may also provide for determining an observed bandwidth for a channel associated with the receive buffer, and identifying a selection of a buffer-related setting from the plurality of buffer-related settings based at least in part on the observed bandwidth.

Embodiments of the present invention are applicable for use with all types of semiconductor integrated circuit ("IC") chips. Examples of these IC chips include but are not limited to processors, controllers, chipset components, PLAs, memory chips, network chips, SoCs, SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A platform comprising:
   a power management controller including first logic, the first logic having first hardware logic, to:
   determine a plurality of buffer-related settings for a corresponding plurality of platform idle states, and
   output the plurality of buffer-related settings,
   a device including a receive buffer and second logic, the second logic having second hardware logic, to:
   identify the plurality of buffer-related settings,
   determine a bandwidth for a channel associated with the receive buffer, and
   identify a selection of a buffer-related setting from the plurality of buffer-related settings based at least in part on the observed bandwidth; and
   a partition table to store the plurality of buffer-related settings, wherein the partition table is to be exposed to the device.

2. The platform of claim 1, wherein one or more of the plurality of buffer-related settings is to include a latency tolerance and a corresponding idle duration, and wherein the selection of the buffer-related setting is to include a selected latency tolerance and a selected idle duration.

3. The platform of claim 2, wherein the second hardware logic is to:
   determine a target latency tolerance based at least in part on the observed bandwidth, and
   compare the target latency tolerance to one or more latency tolerances of the plurality of buffer-related settings.

4. The platform of claim 2, wherein the second hardware logic is to partition the receive buffer in accordance with the selected latency tolerance and the selected idle duration, and wherein the power management interface is to report the selected latency tolerance to the power management controller.

5. The platform of claim 1, wherein the first hardware logic is to determine the plurality of buffer-related settings based at least in part on one or more control register values.

6. The platform of claim 1, wherein the first hardware logic is to:
   identify the selection of the buffer-related setting by the device, and
   select one of the plurality of idle states for the platform based at least in part on the selection by the device.

7. A non-transitory computer readable storage medium comprising a set of instructions which, if executed, cause a power management controller to:

determine a plurality of buffer-related settings for a corresponding plurality of idle states;
communicate one or more of the plurality of buffer-related settings to a device associated with a platform;
generate a partition table based on the plurality of buffer-related settings; and
expose the partition table to the device.

8. The medium of claim 7, wherein the one or more of the plurality of buffer-related settings is to include a latency tolerance and a corresponding idle duration.

9. The medium of claim 7, wherein the plurality of buffer-related settings are to be determined based at least in part on one or more control register values.

10. The medium of claim 9, wherein the instructions, if executed, cause the power management controller to:
identify a selection by the device of a buffer-related setting from the plurality of buffer-related settings; and
select one of the plurality of idle states based at least in part on the selection by the device.

11. A non-transitory computer readable storage medium comprising a set of instructions which, if executed, cause a device to:
identify a plurality of buffer-related settings for a receive buffer of the device;
determine a bandwidth for a channel associated with the receive buffer; and
identify a selection of a buffer-related setting from the plurality of buffer-related settings based at least in part on the observed bandwidth,
wherein the instructions, if executed, cause the device to access a partition table to identify the plurality of buffer-related settings.

12. The medium of claim 11, wherein one or more of the plurality of buffer-related settings is to include a latency tolerance and a corresponding idle duration, and wherein the selection of the buffer-related setting is to include a selected latency tolerance and a selected idle duration.

13. The medium of claim 12, wherein the instructions, if executed, cause the device to:
determine a target buffer configuration based at least in part on the observed bandwidth; and
compare the target buffer configuration to one or more latency tolerances of the plurality of buffer-related settings.

14. The medium of claim 12, wherein the instructions, if executed, cause the device to:
partition the receive buffer in accordance with the selected latency tolerance and the selected idle duration; and
report the selected latency tolerance to a power management controller.

15. The medium of claim 14, wherein the instructions, if executed, cause the device to:
determine a packet loss ratio of the channel associated with the receive buffer; and
modify the selected latency tolerance based at least in part on the packet loss ratio and a loss threshold.

16. The medium of claim 14, wherein the instructions, if executed, cause the device to report an expected idle duration to the power management controller.

17. A device comprising:
a receive buffer; and
logic, the logic at least partially comprising hardware logic, to:
identify a plurality of buffer-related settings for the receive buffer,
determine a bandwidth for a channel associated with the receive buffer, and
identify a selection of a buffer-related setting from the plurality of buffer-related settings based at least in part on the observed bandwidth,
wherein the hardware logic is to access a partition table to identify the plurality of buffer-related settings.

18. The device of claim 17, wherein one or more of the plurality of buffer-related settings is to include a latency tolerance and a corresponding idle duration, and wherein the selection of the buffer-related setting is to include a selected latency tolerance and a selected idle duration.

19. The device of claim 18, wherein the hardware logic is to:
determine a target buffer configuration based at least in part on the observed bandwidth, and
compare the target buffer configuration to one or more latency tolerances of the plurality of buffer-related settings.

20. The device of claim 18, wherein the hardware logic is to:
partition the receive buffer in accordance with the selected latency tolerance and the selected idle duration; and
report the selected latency tolerance to a power management controller.

21. The device of claim 18, wherein the hardware logic is to:
determine a packet loss ratio of the channel associated with the receive buffer, and
modify the selected latency tolerance based at least in part on the packet loss ratio and a loss threshold.

22. The device of claim 21, wherein the hardware logic is to report an expected idle duration to the power management controller.

23. A power management controller comprising:
logic, the logic at least partially comprising hardware logic, to:
determine a plurality of buffer-related settings for a corresponding plurality of idle states,
communicate one or more of the plurality of buffer-related settings to a device associated with a platform,
generate a partition table based on the plurality of buffer-related settings, and
expose the partition table to the device.

24. The power management controller of claim 23, wherein the one or more of the plurality of buffer-related settings is to include a latency tolerance and a corresponding idle duration.

25. The power management controller of claim 23, wherein the plurality of buffer-related settings are to be determined based at least in part on one or more control register values.

26. The power management controller of claim 23, wherein the hardware logic is to:
identify a selection by the device of a buffer-related setting from the plurality of buffer-related settings, and
select one of the plurality of idle states based at least in part on the selection by the device.

* * * * *